(12) United States Patent
Zhang et al.

(10) Patent No.: US 9,828,277 B2
(45) Date of Patent: Nov. 28, 2017

(54) METHODS FOR SEPARATION OF STRENGTHENED GLASS

(71) Applicant: ELECTRO SCIENTIFIC INDUSTRIES, INC., Portland, OR (US)

(72) Inventors: Haibin Zhang, Portland, OR (US); Qian Xu, Beaverton, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 0 days.

(21) Appl. No.: 13/778,950

(22) Filed: Feb. 27, 2013

(65) Prior Publication Data
US 2013/0224439 A1   Aug. 29, 2013

Related U.S. Application Data

(60) Provisional application No. 61/604,380, filed on Feb. 28, 2012.

(51) Int. Cl.
*B23K 26/00* (2014.01)
*B23K 26/02* (2014.01)
(Continued)

(52) U.S. Cl.
CPC .......... *C03B 33/0222* (2013.01); *B23K 26/40* (2013.01); *B23K 2203/50* (2015.10);
(Continued)

(58) Field of Classification Search
CPC .. B23K 26/4075; B23K 26/38; B23K 26/123; B23K 26/367; B23K 2201/40;
(Continued)

(56) References Cited

U.S. PATENT DOCUMENTS 3,287,200 A   11/1966  Hess et al.
4,702,042 A   10/1987  Herringtong et al.
(Continued)

FOREIGN PATENT DOCUMENTS

CN   1657220 A   8/2005
CN   101073145 A   11/2007
(Continued)

OTHER PUBLICATIONS

Machine translation of Japanese Pat. Appl. Pub. No. 2001-274441, published Oct. 5, 2001.
(Continued)

*Primary Examiner* — David Angwin
*Assistant Examiner* — Gyounghyun Bae

(57) ABSTRACT

Methods and apparatus for separating substrates are disclosed, as are articles formed from the separated substrates. A method of separating a substrate having first and second surfaces includes directing a beam of laser light to pass through the first surface and, thereafter, to pass through the second surface. The beam of laser light has a beam waist located at a surface of the substrate or outside the substrate. Relative motion between the beam of laser light and the substrate is caused to scan a spot on a surface of the substrate to be scanned along a guide path. Portions of the substrate illuminated within the spot absorb light within the beam of laser light so that the substrate can be separated along the guide path.

34 Claims, 5 Drawing Sheets

(51) Int. Cl.
*B23K 26/08* (2014.01)
*B60L 1/02* (2006.01)
*C03B 33/02* (2006.01)
*B23K 26/40* (2014.01)
*B23K 103/00* (2006.01)

(52) U.S. Cl.
CPC ............... Y10T 428/24479 (2015.01); Y10T 428/24488 (2015.01)

(58) Field of Classification Search
CPC ........... B23K 26/0039; B23K 26/0604; B23K 26/0635; B23K 26/0807; B23K 26/0087; B23K 26/365; C03B 33/0222; C03C 23/0025; Y10T 428/24479; Y10T 428/24488
USPC .... 219/121.72, 121.6–121.86; 428/157, 156; 65/112, 158, 29.11, 61, 29.18, 160
See application file for complete search history.

(56) References Cited

U.S. PATENT DOCUMENTS

| | | | |
|---|---|---|---|
| 4,828,900 A | 5/1989 | Mouly | |
| 5,043,553 A | 8/1991 | Corfe et al. | |
| 5,413,664 A | 5/1995 | Yagi et al. | |
| 5,543,365 A | 8/1996 | Wills et al. | |
| 5,609,284 A | 3/1997 | Kondratenko | |
| 5,637,244 A | 6/1997 | Erokhin et al. | |
| 5,656,186 A | 8/1997 | Mourou et al. | |
| 5,665,134 A | 9/1997 | Kirby et al. | |
| 5,826,772 A | 10/1998 | Ariglio et al. | |
| 5,973,290 A | 10/1999 | Noddin | |
| 6,143,382 A | 11/2000 | Koyama et al. | |
| 6,211,488 B1 | 4/2001 | Hoekstra et al. | |
| 6,313,435 B1 | 11/2001 | Shoemaker et al. | |
| 6,326,589 B1 | 12/2001 | Beersiek et al. | |
| 6,333,485 B1 | 12/2001 | Haight et al. | |
| 6,521,862 B1 | 2/2003 | Brannon | |
| 6,634,186 B2 | 10/2003 | Abe | |
| 6,642,476 B2 | 11/2003 | Hamann | |
| 6,642,477 B1 | 11/2003 | Patel et al. | |
| 6,756,563 B2 | 6/2004 | Gross et al. | |
| 6,795,274 B1 | 9/2004 | Hsieh et al. | |
| 6,820,330 B1 | 11/2004 | Haba | |
| 6,962,279 B1 | 11/2005 | Marek et al. | |
| 6,992,026 B2* | 1/2006 | Fukuyo ............ B23K 26/0057 438/463 | |
| 7,007,512 B2 | 3/2006 | Kamada et al. | |
| 7,023,001 B2 | 4/2006 | Cournoyer et al. | |
| 7,060,933 B2 | 6/2006 | Burrowes et al. | |
| 7,169,687 B2 | 1/2007 | Li et al. | |
| 7,217,448 B2 | 5/2007 | Koyo et al. | |
| 7,378,342 B2 | 5/2008 | Kirby et al. | |
| 7,605,344 B2* | 10/2009 | Fukumitsu ............ B23K 26/03 219/121.72 | |
| 7,723,212 B2 | 5/2010 | Yamamoto et al. | |
| 8,075,999 B2 | 12/2011 | Barefoot et al. | |
| 8,110,419 B2 | 2/2012 | Zehavi et al. | |
| 8,383,983 B2 | 2/2013 | Lee et al. | |
| 8,584,354 B2 | 11/2013 | Cornejo et al. | |
| 8,609,512 B2 | 12/2013 | Pirogovsky et al. | |
| 8,635,887 B2 | 1/2014 | Black et al. | |
| 8,720,228 B2* | 5/2014 | Li ............ C03B 33/091 219/121.72 | |
| 8,932,510 B2* | 1/2015 | Li ............ C03B 33/093 264/400 | |
| 2001/0035447 A1 | 11/2001 | Gartner et al. | |
| 2001/0038930 A1* | 11/2001 | Yamamoto et al. ..... 428/694 ST | |
| 2001/0040150 A1* | 11/2001 | Suzuki ............ 219/121.69 | |
| 2002/0005805 A1 | 1/2002 | Ogura et al. | |
| 2002/0033558 A1 | 3/2002 | Fahey et al. | |
| 2002/0037132 A1 | 3/2002 | Sercel et al. | |
| 2002/0041946 A1 | 4/2002 | Abe | |
| 2002/0060978 A1* | 5/2002 | Hirotsune et al. .......... 369/275.3 | |
| 2002/0108400 A1* | 8/2002 | Watanabe ............ B23K 26/0604 65/61 | |
| 2003/0044539 A1* | 3/2003 | Oswald .................... 427/404 | |
| 2003/0096078 A1 | 5/2003 | Horisaka et al. | |
| 2003/0102291 A1* | 6/2003 | Liu et al. ................ 219/121.73 | |
| 2003/0111447 A1* | 6/2003 | Corkum et al. .......... 219/121.69 | |
| 2003/0150839 A1 | 8/2003 | Kobayashi et al. | |
| 2003/0201261 A1 | 10/2003 | Kang et al. | |
| 2003/0217568 A1 | 11/2003 | Koyo et al. | |
| 2004/0002199 A1 | 1/2004 | Fukuyo et al. | |
| 2004/0089644 A1 | 5/2004 | Sekiya | |
| 2004/0104846 A1 | 6/2004 | Ogura et al. | |
| 2004/0200067 A1 | 10/2004 | Ogura et al. | |
| 2004/0232524 A1* | 11/2004 | Howard ............ H01L 21/6836 257/620 | |
| 2004/0259329 A1* | 12/2004 | Boyle ............ B23K 26/123 438/460 | |
| 2005/0042805 A1 | 2/2005 | Swenson et al. | |
| 2005/0087522 A1 | 4/2005 | Sun et al. | |
| 2005/0184035 A1 | 8/2005 | Kurosawa et al. | |
| 2005/0221044 A1 | 10/2005 | Gaume et al. | |
| 2005/0223744 A1 | 10/2005 | Horisaka et al. | |
| 2005/0230365 A1 | 10/2005 | Lei et al. | |
| 2006/0049156 A1 | 3/2006 | Mulloy et al. | |
| 2006/0127640 A1 | 6/2006 | Kobayashi et al. | |
| 2006/0151450 A1 | 7/2006 | You et al. | |
| 2006/0169677 A1* | 8/2006 | Deshi ................ 219/121.7 | |
| 2007/0012665 A1* | 1/2007 | Nelson ............ B23K 26/4075 219/121.69 | |
| 2007/0039932 A1 | 2/2007 | Haase et al. | |
| 2007/0170162 A1 | 7/2007 | Haupt et al. | |
| 2007/0262464 A1 | 11/2007 | Watkins et al. | |
| 2007/0272666 A1* | 11/2007 | O'Brien ............ B23K 26/0635 219/121.69 | |
| 2007/0272668 A1* | 11/2007 | Albelo ............ B23K 26/0635 219/121.72 | |
| 2007/0291496 A1 | 12/2007 | Nashner et al. | |
| 2008/0047933 A1 | 2/2008 | Salminen et al. | |
| 2008/0050888 A1* | 2/2008 | Garner ............ B23K 26/38 438/463 | |
| 2008/0093775 A1* | 4/2008 | Menoni et al. ................ 264/400 | |
| 2008/0128953 A1 | 6/2008 | Nagai et al. | |
| 2008/0185367 A1 | 8/2008 | El-Hanany et al. | |
| 2008/0283509 A1 | 11/2008 | Abramov et al. | |
| 2008/0290077 A1 | 11/2008 | DeMeritt et al. | |
| 2008/0296273 A1 | 12/2008 | Lei et al. | |
| 2009/0020511 A1* | 1/2009 | Kommera ............ B23K 26/0661 219/121.68 | |
| 2009/0045179 A1* | 2/2009 | Williams ............ B23K 26/367 219/121.72 | |
| 2009/0201444 A1 | 8/2009 | Yamabuchi et al. | |
| 2009/0212030 A1* | 8/2009 | Clifford, Jr. ......... B23K 26/046 219/121.72 | |
| 2009/0224432 A1 | 9/2009 | Nagatomo et al. | |
| 2009/0242525 A1* | 10/2009 | O'Brien ............ B23K 26/408 219/121.68 | |
| 2010/0025387 A1 | 2/2010 | Arai et al. | |
| 2010/0032417 A1* | 2/2010 | Lei ............ B23K 26/40 219/121.67 | |
| 2010/0147813 A1 | 6/2010 | Lei et al. | |
| 2010/0197116 A1* | 8/2010 | Shah ............ B23K 26/0635 438/463 | |
| 2010/0206008 A1* | 8/2010 | Harvey et al. .................. 65/105 | |
| 2010/0210442 A1 | 8/2010 | Abramov et al. | |
| 2010/0221583 A1 | 9/2010 | Foad et al. | |
| 2010/0243626 A1* | 9/2010 | Baldwin ............ B23K 26/073 219/121.72 | |
| 2010/0291353 A1 | 11/2010 | Dejneka et al. | |
| 2010/0301024 A1* | 12/2010 | Unrath ............ B23K 26/0648 219/121.67 | |
| 2010/0320179 A1* | 12/2010 | Morita ............ B28D 5/0011 219/121.69 | |
| 2011/0003619 A1 | 1/2011 | Fujii | |
| 2011/0049765 A1* | 3/2011 | Li et al. ................ 264/400 | |
| 2011/0127242 A1 | 6/2011 | Li | |
| 2011/0127244 A1* | 6/2011 | Li ............ C03B 33/091 219/121.69 |

(56) References Cited

U.S. PATENT DOCUMENTS

| | | | |
|---|---|---|---|
| 2011/0183116 A1 | 7/2011 | Hung et al. | |
| 2011/0226832 A1 | 9/2011 | Bayne et al. | |
| 2011/0240611 A1* | 10/2011 | Sandstrom | B23K 26/032 219/121.61 |
| 2011/0240616 A1* | 10/2011 | Osako | B23K 26/0042 219/121.72 |
| 2011/0240617 A1* | 10/2011 | Xu et al. | 219/121.72 |
| 2011/0250423 A1* | 10/2011 | Fukasawa | B28D 5/04 428/220 |
| 2011/0259631 A1* | 10/2011 | Rumsby | B23K 26/0613 174/264 |
| 2011/0266264 A1* | 11/2011 | Rumsby | B23K 26/06 219/121.72 |
| 2011/0318996 A1 | 12/2011 | Okafuji et al. | |
| 2012/0052252 A1 | 3/2012 | Kohli et al. | |
| 2012/0135177 A1 | 5/2012 | Cornejo et al. | |
| 2012/0135195 A1 | 5/2012 | Glaesemann et al. | |
| 2012/0145331 A1* | 6/2012 | Gomez | C03B 33/0222 156/712 |
| 2012/0168412 A1 | 7/2012 | Hooper | |
| 2012/0196071 A1 | 8/2012 | Cornejo et al. | |
| 2012/0211923 A1 | 8/2012 | Garner et al. | |
| 2013/0037992 A1 | 2/2013 | Milshtein et al. | |
| 2013/0129947 A1* | 5/2013 | Harvey | C03B 33/091 428/34.4 |
| 2013/0155004 A1 | 6/2013 | Yoshikawa | |
| 2013/0192305 A1 | 8/2013 | Black et al. | |
| 2013/0221053 A1 | 8/2013 | Zhang | |
| 2013/0224439 A1 | 8/2013 | Zhang et al. | |
| 2013/0323469 A1 | 12/2013 | Abramov et al. | |
| 2013/0328905 A1 | 12/2013 | Iwata | |
| 2014/0093693 A1 | 4/2014 | Zhang et al. | |
| 2015/0274574 A1 | 10/2015 | Rekow et al. | |

FOREIGN PATENT DOCUMENTS

| | | |
|---|---|---|
| CN | 100471609 C | 3/2009 |
| CN | 101903301 A | 12/2010 |
| CN | 102356050 A | 2/2012 |
| CN | 102405520 A | 4/2012 |
| CN | 101670487 B | 1/2013 |
| DE | 10029110 B4 | 5/2006 |
| DE | 102006046313 B3 | 1/2008 |
| DE | 102007009786 A1 | 8/2008 |
| DE | 102010012265 A1 | 11/2011 |
| EP | 321838 B1 | 2/1993 |
| EP | 2096375 A1 | 2/2009 |
| EP | 2371778 A1 | 3/2010 |
| JP | 11163403 A | 6/1999 |
| JP | 2002192369 A | 7/2002 |
| JP | 2002-241141 A | 8/2002 |
| JP | 2002308637 A | 10/2002 |
| JP | 2004299969 A | 10/2004 |
| JP | 2005-81715 A | 3/2005 |
| JP | 2007-290011 A | 11/2007 |
| JP | 2009061462 A | 3/2009 |
| JP | 2009-72829 A | 4/2009 |
| JP | 2009280452 A | 12/2009 |
| JP | 2011088179 A | 5/2011 |
| JP | 2011-517299 A | 6/2011 |
| JP | 2011-164508 A | 8/2011 |
| JP | 2011164508 A | 8/2011 |
| JP | 2011230940 A | 11/2011 |
| JP | 2011251879 A | 12/2011 |
| JP | 2012-031018 A | 2/2012 |
| JP | 2013-043795 A | 3/2013 |
| KR | 2010-0031462 A | 3/2010 |
| KR | 2012-015366 A | 2/2012 |
| TW | 201132604 A | 10/2011 |
| WO | WO0222301 A1 | 3/2002 |
| WO | 2003-002289 | 1/2003 |
| WO | WO2008/108332 A1 | 9/2008 |
| WO | WO2009/106582 A2 | 9/2009 |
| WO | WO2010/096359 A1 | 8/2010 |
| WO | 2011/025903 A1 | 3/2011 |
| WO | 2011/025908 A1 | 3/2011 |
| WO | WO2011/025903 A1 | 3/2011 |
| WO | WO2011/025908 A1 | 3/2011 |
| WO | WO 2011025908 A1 * | 3/2011 |
| WO | WO2011117006 A1 | 9/2011 |

OTHER PUBLICATIONS

International Search Report of PCT/US2013/027947, 2 pages.
Written Opinion of PCT/US2013/027947, 5 pages.
Bradley Elkins Riley, "Evporative Etching for Non-Contact Glass Scribing Using a Single-Mode Ytterbium Fiber Laser", North Carolina State University, 2007, 96 pages.
J. Zhang et al., "High-Speed Machining of Glass Materials by Laser-Induced Plasma-Assisted Ablation Using a 532-nm Laser", Appl. Phys. A 67, 499-501, 1998.
Kunihito Nagayama et al. (2011), Pulse Laser Ablation by Reflection of Laser Pulse at Interface of Transparent Materials, Lasers—Applications in Science and Industry, Dr Krzysztof Jakubczak (Ed.), ISBN: 978-953-307-755-0, InTech, Available from: http://www.intechopen.com/books/lasers-applications-in-science-and-industry/pulse-laser-ablation-byreflection-of-laser-pulse-at-interface-of-transparent-materials.
Y. Hanada et al., "Laser-Induced Plasma-assisted Ablation (LIPAA): Fundamental and Industrial Applications", High-Power Laser Ablation VI, Proc. of SPIE vol. 6261, 626111-1 to -15 (2006).
Loeschner, U., et al. "Micromachining of glass with short ns-pulses and highly repetitive fs-laser pulses." Proceedings of the ICALEO. 2008. 9 pages.
Beat Neuenschwander et al., "Processing of Metals and Dielectric Materials with PS-Laserpulses: Results, Strategies, Limitations and Needs" Proc. SPIE 7584, Laser Applications in Microelectronic and Optoelectronic Manufacturing XV, 75840R (Feb. 17, 2010); 14 pages.
M B Strigin, A N Chudinov, "Laser Processing of Glass by Picosecond Pulses", Quantum Electronics 24 (8) 732-735 (1994).
Anatoli A. Abramov et al., "Laser Separation of Chemically Strengthened Glass" Physics Procedia 5 (2010), 285-290.
English translation of the Jun. 17, 2016 Office action concerning Chinese Patent Application No. 201380009631.3, which corresponds with the subject U.S. Appl. No. 13/778,950.
English translation of the Jul. 20, 2016 Office action concerning Chinese Patent Application No. 201380009726.5, which corresponds with the U.S. Appl. No. 13/779,050.
English translation of the Feb. 22, 2016 Office action concerning Chinese Patent Application No. 200980153523.7, which corresponds with the subject U.S. Appl. No. 12/336,609.
English translation of the Mar. 17, 2016 Office action concerning Chinese Patent Application No. 201380049563.3, which corresponds with the subject U.S. Appl. No. 14/033,368.
English translation of the Aug. 1, 2016 Office action concerning Chinese Patent Application No. 201380009749.6, which corresponds with the U.S. Appl. No. 13/779,183.
English translation of the Aug. 30, 2016 Office action concerning Taiwan Patent Application No. 102107470, which corresponds with the U.S. Appl. No. 13/779,183.
English translation of the Mar. 3, 2016 Office action concerning Chinese Patent Application No. 201380009726.5, which corresponds with U.S. Appl. No. 13/8779,050.
English translation of the Feb. 7, 2017 Office action concerning Japanese Patent Application No. 2014-559964, which corresponds with the subject U.S. Appl. No. 13/778,950, 4pages.
English translation of the Apr. 19, 2017 Office action concerning Chinese Patent Application No. 2013-80009631.3, which corresponds with the subject U.S. Appl. No. 13/778,950, 11 pages.
English translation of the Apr. 1, 2017 Office action concerning Chinese Patent Application No. 2013-80049563.3, which corresponds with related U.S. Appl. No. 14/033,368, 13 pages.
English translation of the Mar. 7, 2017 Office action (Received Apr. 6, 2017) concerning Japanese Patent Application No. 2014-559989, which corresponds with related U.S. Appl. No. 13/779,183, 3 pages.

(56) References Cited

OTHER PUBLICATIONS

Office action for Chinese Patent Application No. 200980153523.7 dated Jan. 8, 2014, 7 pages.
Office action for Chinese Patent Application No. 200980153523.7 dated Jun. 5, 2013, 8 pages.
English translation of the Aug. 17, 2015 Office action concerning Chinese Patent Application No. 200980153523.7, which corresponds with U.S. Appl. No. 12/336,609.

* cited by examiner

METHODS FOR SEPARATION OF STRENGTHENED GLASS

CROSS-REFERENCE TO RELATED APPLICATIONS

This application claims the benefit of U.S. Provisional Application No. 61/604,380, filed Feb. 28, 2012, which is hereby incorporated by reference in its entirety.

BACKGROUND

Embodiments of the present invention relate generally to methods for separating substrates of glass and, more specifically, to methods for separating strengthened glass substrates. Embodiments of the present invention also relate to apparatuses for separating substrates of glass, and to pieces of glass that have been separated from substrates of glass.

Thin strengthened glass substrates, such as chemically- or thermally-strengthened substrates have found wide-spread application in consumer electronics because of their excellent strength and damage resistance. For example, such glass substrates may be used as cover substrates for LCD and LED displays and touch applications incorporated in mobile telephones, display devices such as televisions and computer monitors, and various other electronic devices. To reduce manufacturing costs, it may be desirable that such glass substrates used in consumer electronics devices be formed by performing thin film patterning for multiple devices on a single large glass substrate, then sectioning or separating the large glass substrate into a plurality of smaller glass substrates using various cutting techniques.

However the magnitude of compressive stress and the elastic energy stored within the central tension region may make cutting and finishing of chemically- or thermally-strengthened glass substrates difficult. The high surface compression and deep compression layers make it difficult to mechanically scribe the glass substrate as in traditional scribe-and-bend processes. Furthermore, if the stored elastic energy in the central tension region is sufficiently high, the glass may break in an explosive manner when the surface compression layer is penetrated. In other instances, the release of the elastic energy may cause the break to deviate from a desired separation path. Accordingly, a need exists for alternative methods for separating strengthened glass substrates.

SUMMARY

One embodiment disclosed herein can be exemplarily characterized as a method (e.g., for separating a substrate) that includes: providing a substrate having a first surface and a second surface opposite the first surface, wherein at least one of the first surface and the second surface is compressively stressed and an interior of the substrate is under a state of tension; directing a beam of laser light to pass through the first surface and to pass through the second surface after passing through the first surface, wherein the beam of laser light has a beam waist at a surface of the substrate or outside the substrate; causing the beam of laser light to be scanned relative to the substrate along a guide path; removing material from a surface of the substrate at a plurality of locations along the guide path with the beam of laser light; and separating the substrate along the guide path.

Another embodiment disclosed herein can be exemplarily characterized as a method (e.g., for separating a substrate) that includes: providing a substrate having a first surface and a second surface opposite the first surface, wherein at least one of the first surface and the second surface is compressively stressed and an interior of the substrate is under a state of tension; machining the substrate at a plurality of positions within the substrate, wherein at least one of the plurality of machined positions is located at the second surface and at least one of the plurality of positions is located within the interior of the substrate; and separating the substrate along a guide path. The machining can include directing a beam of laser light to pass through the first surface and to pass through the second surface after passing through the first surface, wherein the beam of laser light has an intensity and a fluence in a spot at a surface of the substrate sufficient to stimulate multiphoton absorption of light by a portion of the substrate illuminated by the spot; and causing the beam of laser light to be scanned relative to the substrate such that at least some of the plurality of machined positions are arranged along a guide path.

Yet another embodiment disclosed herein can be exemplarily characterized as an apparatus for separating a substrate having a first surface and a second surface opposite the first surface, wherein the apparatus includes: a laser system configured to direct a focused beam of laser light along an optical path, the focused beam of laser light having a beam waist; a workpiece support system configured to support the strengthened glass substrate such that the first surface faces toward the laser system and such that the beam waist is locatable at a surface of the substrate or outside the substrate; and a controller coupled to at least of the laser system and the workpiece support system. The controller can include: a processor configured to execute instructions to control the at least of the laser system and the workpiece support system to: direct the beam of laser light to pass through the first surface and to pass through the second surface after passing through the first surface, wherein the beam of laser light has an intensity and a fluence in a spot at a surface of the substrate sufficient to stimulate multiphoton absorption of light by a portion of the substrate illuminated by the spot; and cause the beam of laser light to be scanned relative to the substrate along a guide path. The controller can further include a memory configured to store the instructions.

Still another embodiment disclosed herein can be exemplarily characterized as an article of manufacture that includes: a strengthened glass article having a first surface, a second surface and an edge surface. The edge surface can include: a primary edge region extending from the second surface toward the first surface; and a notch region extending from the primary edge region to the first surface.

DETAILED DESCRIPTION OF THE ILLUSTRATED EMBODIMENTS

Figure 1A:
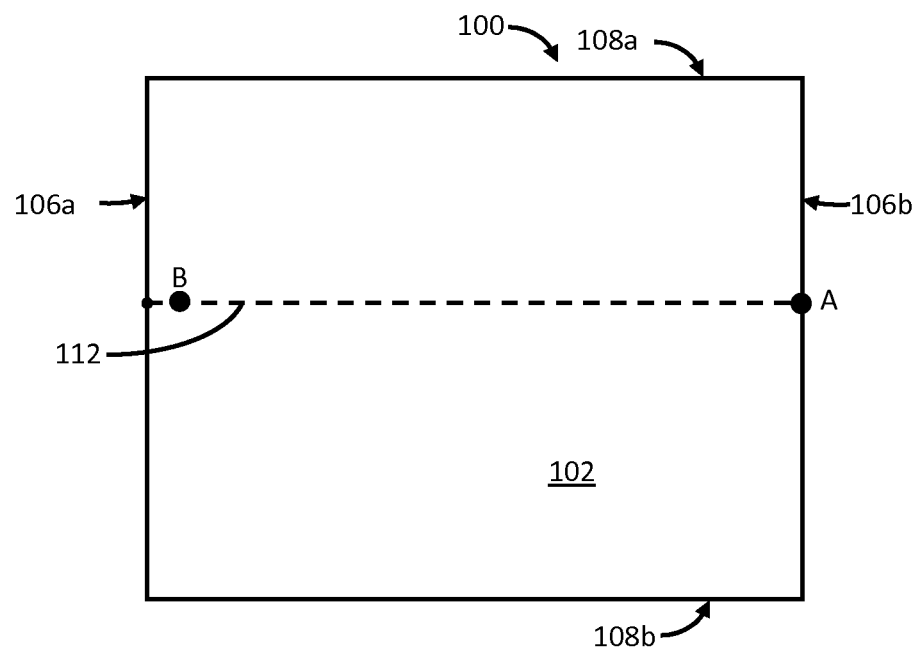
FIGS. 1A and 1B are top plan and cross-section views, respectively, illustrating a strengthened glass substrate capable of being separated according to embodiments of the present invention.

The invention is described more fully hereinafter with reference to the accompanying drawings, in which example embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the sizes and relative sizes of layers and regions may be exaggerated for clarity.

In the following description, like reference characters designate like or corresponding parts throughout the several views shown in the figures. As used herein, the singular forms "a," "an" and "the" are intended to include the plural forms as well, unless the context clearly indicates otherwise. It will also be understood that, unless otherwise specified, terms such as "top," "bottom," "outward," "inward," and the like, are words of convenience and are not to be construed as limiting terms. In addition, whenever a group is described as "comprising" at least one of a group of elements and combinations thereof, it is understood that the group may comprise, consist essentially of, or consist of any number of those elements recited, either individually or in combination with each other. Similarly, whenever a group is described as "consisting" of at least one of a group of elements or combinations thereof, it is understood that the group may consist of any number of those elements recited, either individually or in combination with each other. Unless otherwise specified, a range of values, when recited, includes both the upper and lower limits of the range, as well as any sub-ranges therebetween.

Referring to the drawings in general, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Figure 1B:
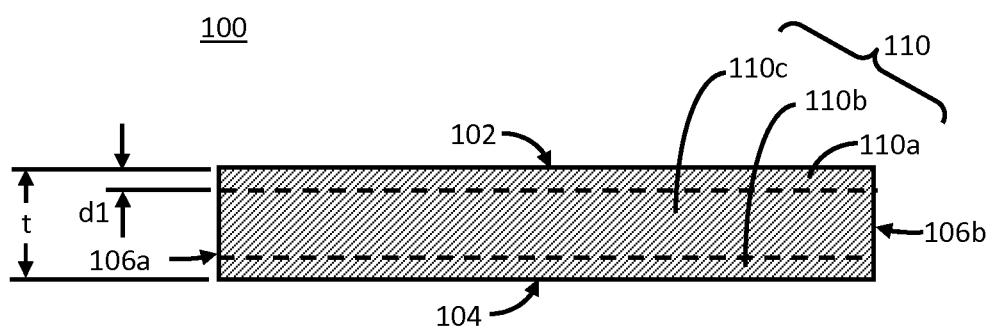

FIGS. 1A and 1B are top plan and cross-section views, respectively, illustrating a strengthened glass substrate capable of being separated according to embodiments of the present invention.

Referring to FIGS. 1A and 1B, a strengthened glass substrate 100 (also referred to herein simply as a "substrate") includes a first surface 102, a second surface 104 opposite the first surface, and edges 106a, 106b, 108a and 108b. Generally, the edges 106a, 106b, 108a and 108b extend from the first surface 102 to the second surface 104. Although the substrate 100 is illustrated as essentially square when viewed from a top plan view, it will be appreciated that the substrate 100 can be any shape when viewed from a top plan view. The substrate 100 can be formed from any glass composition including, without limitation, borosilicate glasses, soda-lime glass, aluminosilicate glass, alumino-borosilicate glass, or the like, or a combination thereof. The substrate 100 separated according to the embodiments described herein may be strengthened by a strengthening process such as an ion exchange chemical strengthening process, thermal tempering, or the like or a combination thereof. It should be understood that although embodiments herein are described in the context of chemically strengthened glass substrates, other types of strengthened glass substrates may be separated according the embodiments exemplarily described herein. Generally, the substrate 100 may have a thickness, t, greater than 200 µm and less than 10 mm. In one embodiment, the thickness, t, may be in a range from 500 µm to 2 mm. In another embodiment, the thickness, t, may be in a range from 600 µm to 1 mm. It will be appreciated, however, that the thickness, t, may be greater than 10 mm or less than 200 µm.

Referring to FIG. 1B, an interior 110 of the substrate 100 includes compression regions (e.g., first compression region 110a and second compression region 110b) and a tension region 110c. Portions of the substrate 100 within the compression regions 110a and 110b are kept in a compressive stress state that provides the glass substrate 100 its strength. The portion of the substrate 100 in the tension region 110c is under tensile stress to compensate for the compressive stresses in the compression regions 110a and 110b. Generally, the compressive and tensile forces within the interior 110 balance each other out so the net stress of the substrate 100 is zero.

As exemplarily illustrated, the first compression region 110a extends from the first main surface 102 toward the second main surface 104 by a distance (or depth) d1, and thus has a thickness (or "depth of layer", DOL) of d1. Generally, d1 can be defined as the distance from the physical surface of the substrate 100 to a point within the interior 110 where the stress is zero. The DOL of the second compression region 110b can also be d1.

Depending on process parameters such as composition of the substrate 100 and the chemical and/or thermal process by which the substrate 100 was strengthened, all of which are known to those skilled in the art, d1 can be generally greater than 10 µm. In one embodiment, d1 is greater than 20 µm. In one embodiment, d1 is greater than 40 µm. In another embodiment, d1 is greater than 50 µm. In yet embodiment, d1 can even be greater than 100 µm. It will be appreciated that the substrate 100 can be prepared in any manner to produce a compression region with d1 less than 10 µm. In the illustrated embodiment, the tension region 110c extends to the edge surfaces 106a and 106b (as well as edge surfaces 108a and 108b). In another embodiment, however, additional compression regions can extend along edge surfaces 106a, 106b, 108a and 108b. Thus, collectively, the compression regions form a compressively-stressed outer region extending from the surfaces of the substrate 100 into an interior of the substrate 100 and the tension region 110c, which is under a state of tension, is surrounded by compressively-stressed outer region.

Depending on the aforementioned process parameters, the magnitude of compressive stress in the compression regions 110a and 110b are measured at or near (i.e., within 100 µm) the first surface 102 and second surface 104, respectively, and can be greater than 69 MPa. For example, in some embodiments the magnitude of compressive stresses in the compression regions 110a and 110b can be greater than 100

MPa, greater than 200 MPa, greater than 300 MPa, greater than 400 MPa, greater than 500 MPa, greater than 600 MPa, greater than 700 MPa, greater than 800 MPa, greater than 900 MPa, or even greater than 1 GPa. The magnitude of tensile stress in the tension region 110c can be obtained by the following:

$$CT = \frac{CS \times DOL}{t - 2 \times DOL}$$

where CT is the central tension within the substrate 100, CS is the maximum compressive stress in a compression region(s) expressed in MPa, t is the thickness of the substrate 100 expressed in mm, and DOL is the depth of layer of the compression region(s) expressed in mm.

Having exemplarily described a substrate 100 capable of being separated according to embodiments of the present invention, exemplary embodiments of separating the substrate 100 will now be described. Upon implementing these methods, the substrate 100 can be separated along a guide path such as guide path 112. Although guide path 112 is illustrated as extending in a straight line, it will be appreciated that all or part of the guide path 112 may extend along a curved line.

Figure 2A:
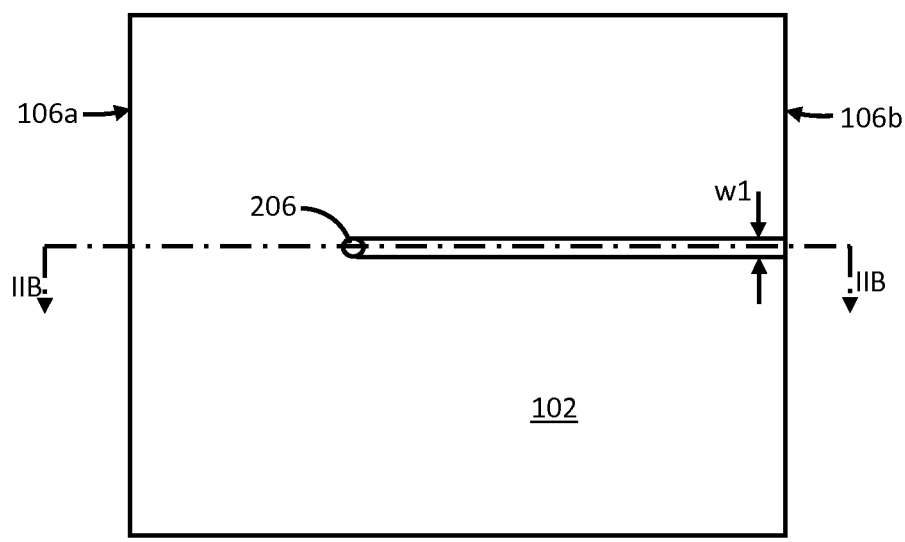
FIG. 2A is a plan view illustrating one embodiment of a process of forming a guide trench in the substrate exemplarily described with respect to FIGS. 1A and 1B.
Figure 2B:
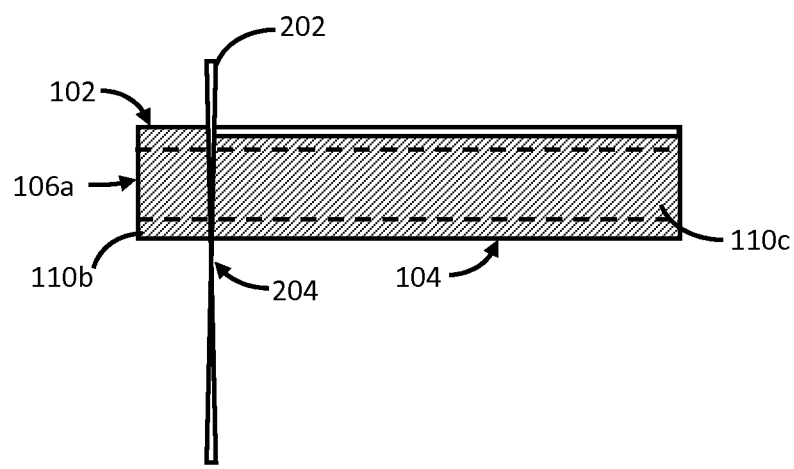
FIG. 2B is a cross-section view taken along line IIB-IIB of FIG. 2A.
Figure 3A:
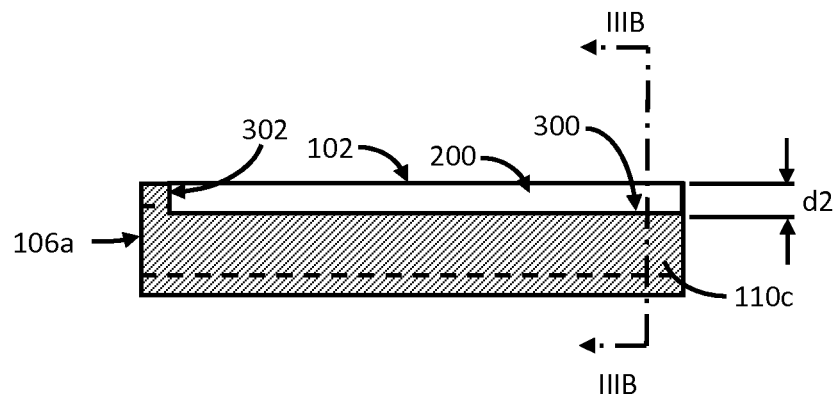
FIG. 3A is a cross-section view illustrating one embodiment of a guide trench formed according to the process exemplarily described with respect to FIGS. 2A and 2B.
Figure 3B:
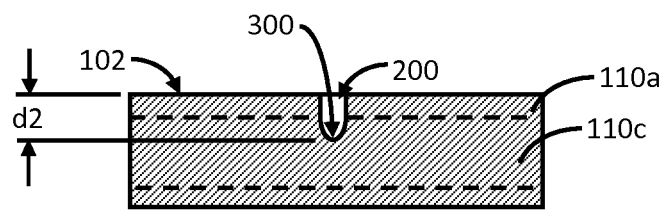
FIG. 3B is a cross-section view taken along line IIIB-IIIB of FIG. 3A.
Figure 4:
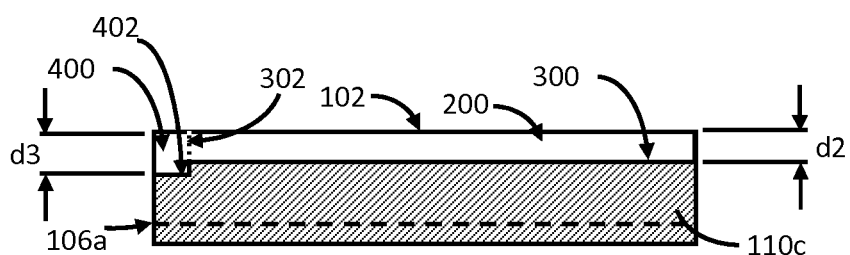
FIGS. 4 and 5 are cross-section views illustrating one embodiment of a process of separating a substrate along the guide trench exemplarily described with respect to FIGS. 2A-3B.
Figure 5:
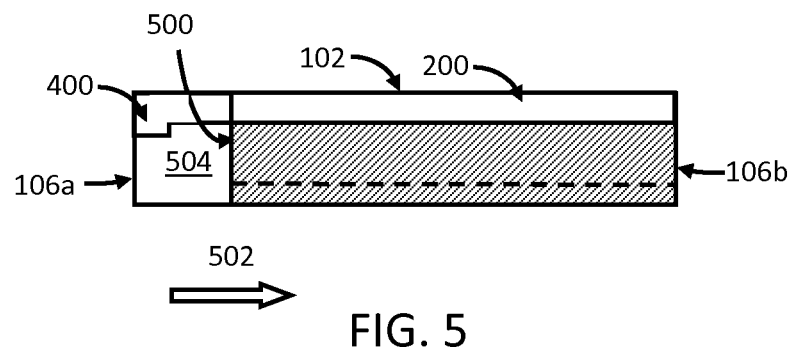

FIGS. 2A to 5 illustrate one embodiment of a process of separating a strengthened glass substrate such as substrate 100, which includes forming a guide trench in the substrate 100 and then separating the substrate 100 along the guide trench. Specifically, FIGS. 2A and 2B are top plan and cross-section views, respectively, illustrating one embodiment of a process of forming the guide trench; FIGS. 3A and 3B are cross-section and side plan views, respectively, illustrating one embodiment of a guide trench formed according to the process exemplarily described with respect to FIGS. 2A and 2B; and FIGS. 4 and 5 are cross-section views illustrating one embodiment of a process of separating a substrate along the guide trench exemplarily described with respect to FIGS. 2A-3B.

Referring to FIGS. 2A and 2B, a guide trench (e.g., the guide trench 200 shown in FIGS. 3A and 3B) can be formed by directing a beam 202 of laser light onto the substrate 100 and then causing the beam 202 to be scanned relative to the substrate 100 between two points (e.g., points A and B, illustrated in FIG. 1A) along the guide path 112 at least once. As illustrated, point A is located at edge 106b and point B is spaced apart from the edge 106a. It will be appreciated that one or both of points may be located at a position different from that illustrated. For example, point B can be located at the edge 106a. FIGS. 2A and 2B illustrate the guide trench-forming process at a state in which the beam 202 has partially completed a first scan where the beam 202 is being scanned from point A to point B.

Generally, the beam 202 of laser light is directed onto the substrate along an optical path such that the beam 202 passes through the first surface 102 and, thereafter, through the second surface 104. In one embodiment, the light within the beam 202 is provided as a series of pulses of laser light and the beam 202 can be directed along the optical path by first producing a beam of laser light and then subsequently focusing the beam of laser light to produce the beam waist 204. In the illustrated embodiment, the beam waist 204 is located outside the substrate 100 such that beam waist 204 is closer to the second surface 104 than the first surface 102. By locating the beam waist 204 outside the substrate 100, closer to the second surface 104 than the first surface 102, the beam 202 can be nonlinearly focused within the substrate 100 to damage the interior 110 of the substrate 100 within a long narrow region thereof (e.g., due to a balance of nonlinear Kerr effect, diffraction, plasma defocusing, etc.), which can facilitate subsequent separation of the substrate 100. By changing the manner in which the beam 202 is focused, however, the beam waist 204 can be provided closer to the second surface 104 than the first surface 102. In still other embodiments, the beam waist 204 can intersect the first surface 102 (so as to be at the first surface 102) or the second surface 104 (so as to be at the second surface 104).

In the illustrated embodiment, the beam waist 204 is located outside the substrate 100 so as to be spaced apart from the substrate (e.g., when measured along the optical path) by a distance greater than 0.5 mm. In one embodiment, the beam waist 204 is spaced apart from the substrate 100 by a distance less than 3 mm. In one embodiment, the beam waist 204 can be spaced apart from the substrate 100 by a distance of 1.5 mm. It will be appreciated, however, that the beam waist 204 can be spaced apart from the substrate 100 by a distance greater than 3 mm or less than 0.5 mm. In some embodiments, the distance by which the beam waist 204 is spaced apart from the substrate 100 can be selected based on whether the beam waist 204 is closer to the first surface 102 or the second surface 104. As will be discussed in greater detail below, the distance by which the beam waist 204 is spaced apart from the substrate 100 can be selected based on the desired configuration of a guide trench used to aid in separation of the substrate 100.

Generally, light within the beam 202 of laser light has at least one wavelength greater than 100 nm. In one embodiment, light within the beam 202 of laser light can have at least one wavelength less than 3000 nm. For example, light within the beam 202 of laser light can have a wavelength of 523 nm, 532 nm, 543 nm, or the like or a combination thereof. As mentioned above, light within the beam 202 is provided as a series of pulses of laser light. In one embodiment, at least one of the pulses can have a pulse duration greater than 10 femtoseconds (fs). In another embodiment, at least one of the pulses can have a pulse duration less than 500 nanoseconds (ns). In yet another embodiment, at least one pulse can have a pulse duration of about 10 picoseconds (ps). Moreover, the beam 202 may be directed along the optical path at a repetition rate greater than 10 Hz. In one embodiment, the beam 202 may be directed along the optical path at a repetition rate less than 100 MHz. In another embodiment, the beam 202 may be directed along the optical path at a repetition rate of about 400 kHz. It will be appreciated that the power of the beam 202 may be selected based on, among other parameters, the wavelength of light within the beam 202 and the pulse duration. For example, when the beam 202 has a green wavelength (e.g., 523 nm, 532 nm, 543 nm, or the like) and a pulse duration of about 10 ps, the power of the beam 202 may have a power of 20 W (or about 20 W). In another example, when the beam 202 has a UV wavelength (e.g., 355 nm, or the like) and a pulse duration of about less than 10 ns (e.g., 1 ns), the power of the beam 202 may have a power in a range from 10 W-20 W (or from about 10 W to about 20 W). It will be appreciated, however, that the power of the beam 202 may be selected as desired.

Generally, parameters of the beam 202 (also referred to herein as "beam parameters") such as the aforementioned wavelength, pulse duration, repetition rate and power, in addition to other parameters such as spot size, spot intensity, fluence, or the like or a combination thereof, can be selected such that the beam 202 has an intensity and fluence in a spot 206 at the first surface 102 sufficient to ablate a portion of the substrate 100 illuminated by the spot 206 or to induce multiphoton absorption of light within the beam 202 by the portion of the first surface 102 illuminated by the spot 206. However by changing, for example, the manner in which the beam 202 is focused, the spot 206 can be moved to the second surface 104. Accordingly, a portion of the substrate 100 at the first surface 102 or the second surface 104 can be removed when the portion is illuminated by the spot 206. In one embodiment, the spot 206 can have a circular shape with a diameter greater than 1 µm. In another embodiment, the diameter of the spot 206 can be less than 100 µm. In yet another embodiment, the diameter of the spot 206 can be about 30 µm. It will be appreciated, however, that the diameter can be greater than 100 µm or less than 1 µm. It will also be appreciated that the spot 206 can have any shape (e.g., ellipse, line, square, trapezoid, or the like or a combination thereof).

Generally, the beam 202 can be scanned between the two points A and B along a guide path 112 at least once. In one embodiment, the beam 202 is scanned between the two points along the guide path at least 5 times. In another embodiment, the beam 202 is scanned between the two points along the guide path at least 10 times. Generally, the beam 202 can be scanned between the two points along at least a portion of the guide path 112 at a scan rate greater than or equal to 1 m/s. In another embodiment, the beam 202 is scanned between the two points along at least a portion of the guide path 112 at a scan rate greater than 2 m/s. It will be appreciated, however, that the beam 202 may also be scanned between the two points along at least a portion of the guide path 112 at a scan rate less than 1 m/s. For example, the beam 202 can be scanned at a scan rate of 80 mm/s, 75 mm/s, 50 mm/s, 30 mm/s, or the like. It will also be appreciated that the scan rate and the number of times the beam 202 is scanned between the two points A and B can be selected based on the aforementioned beam parameters, as well as desired depth of the guide trench 200 composition of the substrate, edge quality desired of pieces separated from the substrate 100.

Guide trench parameters such as the width (e.g., denoted at "w1", see FIG. 2A), depth (e.g., denoted at "d2", see FIG. 3A), location of an end of the guide trench 200, cross-sectional profile, and the like, can be selected by adjusting one or more scanning parameters, beam waist placement parameters and/or the aforementioned beam parameters. Exemplary scanning parameters include the aforementioned scan rate, number of times to scan between points A and B, or the like or a combination thereof. Exemplary beam waist placement parameters include whether or not the beam waist 204 is located outside the substrate 100 and how far the beam waist 204 is spaced apart from the substrate 100, whether or not the beam waist 204 is closer to the first surface 102 or the second surface 104, whether or not the beam waist 204 is at the first surface 102 or the second surface 104, or the like or a combination thereof. Upon completing the guide trench-forming process, a guide trench 200 is formed as shown in FIGS. 3A and 3B.

Referring to FIGS. 3A and 3B, the depth d2 of the guide trench 200, at any location along the guide path 112, can be defined as the distance from the physical surface of the substrate 100 in which it is formed (e.g., the first surface 102, as exemplarily illustrated) to the lower surface 300 of the guide trench 200. Depending on the aforementioned beam parameters, scanning parameters, and beam waist placement parameters, d2 can be greater than d1, equal to d1 or less than d1 at any location along the guide path 112. When d2 is greater than d1, d2 can be in a range of 5% (or less than 5%) to 100% (or more than 100%) greater than d1. When d2 is less than d1, d2 can be in a range of 1% (or less than 1%) to 90% (or more than 90%) less than d1. In one embodiment, the aforementioned beam parameters, scanning parameters, beam waist placement parameters, and the like, can be selected such that d2 can be greater than 30 µm. In another embodiment, d2 can be less than 50 µm. In still another embodiment, d2 can be about 40 µm.

As shown in FIG. 3A, an end 302 of the guide trench 200 is spaced apart from the edge 106a of the substrate 100. The location of the end 302 within the substrate 100 corresponds to the location of point B shown in FIG. 1A. Thus if point B were relocated to the edge 106a, the end 302 of the guide trench 200 would coincide with the edge 106a (so as to be at the edge 106a).

Referring to FIG. 3B, the aforementioned beam parameters, scanning parameters, beam waist placement parameters, and the like, can be selected to adjust the radius of curvature of the lower surface 300. Depending on the aforementioned beam parameters, scanning parameters, beam waist placement parameters, substrate parameters (e.g., substrate composition, compression region depth, magnitude of compressive stresses within a compression region, magnitude of tensile stresses within a tension region, or the like or a combination thereof), or the like or a combination thereof, guide trench parameters (e.g., the depth d2 of the guide trench 200, the radius of curvature of the guide trench 200, location of the end 302 of the guide trench 200 relative to the edge of the substrate 100, or the like) can be selected to promote desirable separation of the substrate 100 along the guide path 112. For example, if the depth d2 is too small and/or if the radius of curvature is too large, the substrate 100 may separate along a path that undesirably deviates away from the guide path 112, or may undesirably produce small cracks in the substrate 100 that can reduce the strength of pieces of strengthened glass that are separated from the substrate 100.

FIGS. 4 and 5 are cross-section views illustrating one embodiment of a process of separating a substrate along a guide trench as shown in FIGS. 2A-3B.

In one embodiment, the aforementioned guide trench parameters can be selected to ensure that the substrate 100 separates (e.g., along the guide trench 200) spontaneously upon formation of the guide trench 200. In the illustrated embodiment, however, the aforementioned guide trench parameters are selected such that the substrate 100 is prevented from spontaneously separating along the guide trench 200. In such embodiments, one or more additional processes can be performed to form a vent crack within the substrate 100 after the guide trench 200 is formed. The width, depth, size, etc., of such a vent crack can be selected and/or adjusted (e.g., based on the parameters of the one or more additional processes) to ensure that the substrate 100 can be separated along the guide path 112 upon forming the vent crack. Thus, the vent crack and the guide trench 200 can be configured such that the substrate 100 is separable along the guide path 112 upon forming the vent crack. The vent crack can be formed in any manner. For example, the vent crack can be formed by laser radiation onto the substrate 100, by mechanically impacting the substrate 100, by chemically etching the substrate 100, or the like or a combination thereof.

When forming the vent crack by directing laser radiation onto the substrate 100, the laser radiation can have at least one wavelength that is greater than 100 nm. In one embodiment, the laser radiation can have at least one wavelength that is less than 11 µm. For example, the laser radiation can have at least one wavelength that is less than 3000 nm. In another embodiment, the laser radiation has at least one wavelength selected from the group consisting of 266 nm, 523 nm, 532 nm, 543 nm, 780 nm, 800 nm, 1064 nm, 1550 nm, 10.6 µm, or the like. In one embodiment, the laser radiation can be directed into the guide trench 200, outside the guide trench 200, or a combination thereof. Similarly, the laser radiation can be directed at an edge of a surface of the substrate 100 or away from the edge. In one embodiment, the laser radiation can have a beam waist similar to the beam waist 200. Such a beam waist may be located outside the substrate 100 or be at least partially coincident with any portion of the substrate 100. When forming the vent crack by mechanically impacting the substrate 100, a portion of the substrate 100 can be mechanically impacted any suitable method (e.g., by hitting, grinding, cutting, or the like or a combination thereof). When forming the vent crack by chemically etching the substrate 100, a portion of the substrate 100 can be removed upon being contacted with an etchant (e.g., a dry etchant, a wet etchant, or the like or a combination thereof).

In other embodiments, the vent crack can be characterized as being formed by removing a portion of the substrate 100. With reference to FIG. 4, the vent crack according to one embodiment can be formed by removing a portion of the substrate 100 to form an initiation trench, such as initiation trench 400, along the guide path 112. Thus, the initiation trench 400 can be aligned with the guide trench 200. In another embodiment, however, the initiation trench 400 can be spaced apart from the guide path 112 so as not to be aligned with the guide trench 200. In such an embodiment, the initiation trench 400 is still sufficiently close to the guide path 112 to initiate a crack that can propagate to the guide trench 200.

In one embodiment, the initiation trench 400 and the guide trench 200 extend into the substrate 100 from the same surface (e.g., the first surface 102, as exemplarily illustrated). In the illustrated embodiment, the initiation trench 400 extends into the substrate 100 from the surface 102. In another embodiment however, the initiation trench 400 can extend into the substrate 100 from the guide trench 200 (e.g., from the lower surface 300 of guide trench 200). In the illustrated embodiment, the initiation trench 400 extends from the end 302 of the guide trench 200 along the guide path 112 (e.g., toward the edge 106b). In another embodiment however, the initiation trench 400 can extend along the guide path 112 from the edge 106a of the substrate 100, or can extend along the guide path 112 from any location of the guide path 200. A width of the initiation trench 400 can be greater than, less than or equal to the width, w1, of the of the guide trench 200. As exemplarily illustrated, the length of the initiation trench 400 (e.g., as measured along the guide path 112 shown in FIG. 1A) is less than the length of the guide trench 200 (e.g., as also measured along the guide path 112). In other embodiments, however, the length of the initiation trench 400 can be equal to or greater than the length of the guide trench 200.

As exemplarily illustrated, the initiation trench 400 extends to a depth d3 such that a lower surface 402 extends into the tension region 110c. In another embodiment, however, the initiation trench 400 can extend almost to tension region 110c or extend to a boundary between compression region 110a and tension region 110c. Similar to the depth d2, the depth d3 of the initiation trench 400 can be defined as the distance from the physical surface of the substrate 100 in which it is formed (e.g., the first surface 102, as exemplarily illustrated) to the lower surface 402 of the initiation trench 400. When greater than d1, d3 can be in a range of 5% (or less than 5%) to 100% (or more than 100%) greater than d1. When less than d1, d3 can be in a range of 1% (or less than 1%) to 90% (or more than 90%) less than d1. In one embodiment, the aforementioned beam parameters, scanning parameters, beam waist placement parameters, or the like, or a combination thereof can be selected such that d3 can be at least 20 µm, at least 30 µm, at least 40 µm, at least 50 µm, greater than 50 µm, less than 20 µm, or the like. In another embodiment, d3 can be about 40 µm or about 50 µm. The initiation trench 400 can be formed by any desired method. For example, the initiation trench 400 can be formed by directing laser radiation onto the substrate 100, by mechanically impacting the substrate 100 (e.g., by cutting, grinding, etc.), by chemically etching the substrate 100, or the like or a combination thereof.

Upon forming the vent crack, the vent crack spontaneously propagates along the guide trench 200 to separate the substrate 100 along the guide path 112. For example, and with reference to FIG. 5, a leading edge 500 of the vent crack can propagate in the direction indicated by arrow 502, along the guide trench 200. Reference numeral 504 identifies a new edge surface of a portion of the substrate 100 that has been separated along the guide path 112.

Figure 6A:
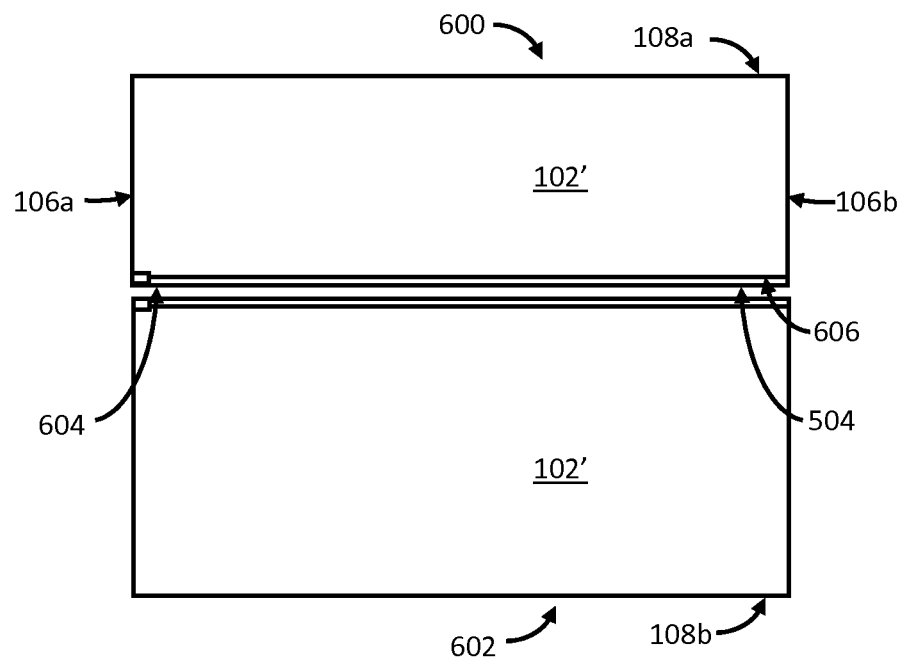
FIG. 6A is a top plan view illustrating pieces of strengthened glass that have been separated from the substrate shown in FIG. 1 according to the processes exemplarily described with respect to FIGS. 2A-5.
Figure 6B:
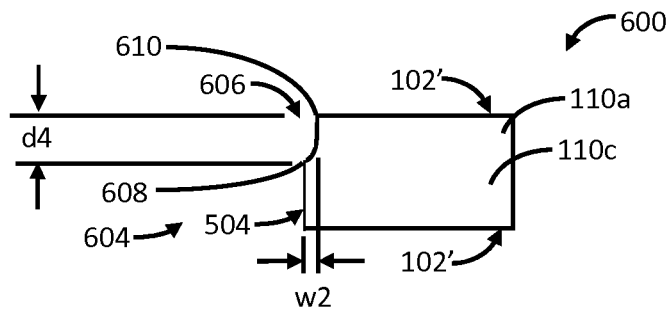
FIG. 6B is a side plan view illustrating a piece of strengthened glass shown in FIG. 6A.

FIG. 6A is a top plan view illustrating pieces of strengthened glass that have been separated from the substrate shown in FIG. 1 according to the processes exemplarily described with respect to FIGS. 2A-5. FIG. 6B is a side plan view illustrating a piece of strengthened glass shown in FIG. 6A.

Referring to FIGS. 6A and 6B, after the crack 500 propagates along the length of guide trench 200, the substrate 100 is fully separated into strengthened glass articles (also referred to herein as "articles") 600 and 602. Each article 600 or 602 can include a first surface 102' and a second surface 104' corresponding to the first surface 102 and second surface 104, respectively, of the substrate 100. Each article can further include an edge 604 obtained upon separating the substrate 100. Generally, the edge 604 can include the edge surface 504 and a notch region 606. The notch region 606 corresponds to the portions of the substrate 100 that were exposed to guide trench 200, the initiation trench 400 or a combination thereof. Accordingly, the notch region 606 extends from an edge 608 of the edge surface 504 and an edge 610 of the first surface 102'. The notch region 606 may have a depth d4 that is greater than, less than, or equal to any of depths d2 or d3. In one embodiment, d4 may be substantially equal to d2 or d3. Generally, d4 can be measured as the distance between edges 608 and 610 along a direction that is at least substantially perpendicular to the first surface 102' (or second surface 104') or along a direction that is at least substantially parallel to the edge surface 504. Similarly, the notch region 606 may have a width w2 that is greater than, less than, or equal to width w1. In one embodiment, w2 may be substantially 50% of w1. Generally, w2 can be measured as the distance between edges 608 and 610 along a direction that is at least substantially perpendicular to the edge surface 504 or along a direction that is at least substantially parallel to the first surface 102' (or second surface 104').

Figure 7:
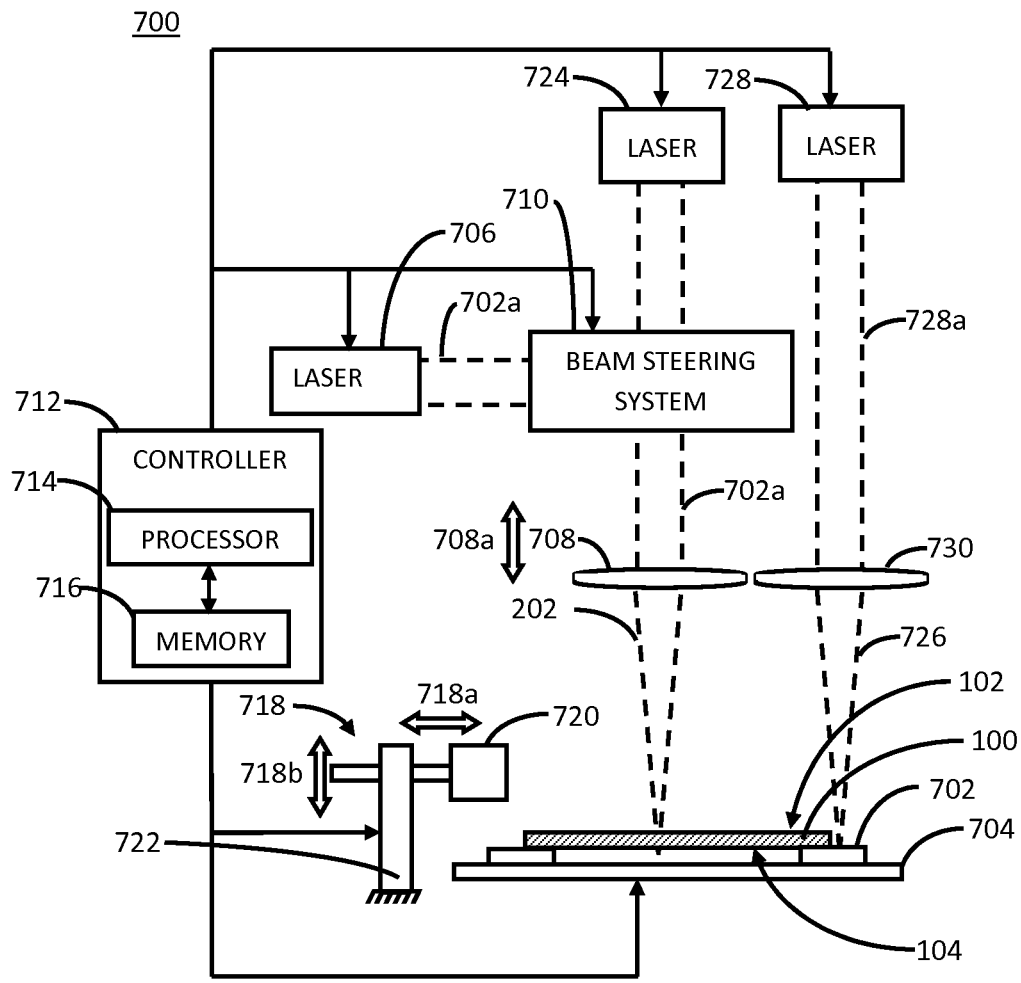
FIG. 7 schematically illustrates one embodiment of an apparatus configured to perform the processes exemplarily described with respect to FIGS. 2A-6B.

Strengthened glass articles, such as article 600 or 602, can be used as protective cover plates (as used herein, the term "cover plate" includes a window, or the like) for display and touch screen applications such as, but not limited to, portable communication and entertainment devices such as telephones, music players, video players, or the like; and as a display screen for information-related terminals (IT) (e.g., portable computer, laptop computer, etc.) devices; as well as in other applications. It will be appreciated that the articles 600 and 602 exemplarily described above with respect to FIGS. 6A and 6B may be formed using any desired apparatus. FIG. 7 schematically illustrates one embodiment of an apparatus configured to perform the processes exemplarily described with respect to FIGS. 2A-6B.

Referring to FIG. 7, an apparatus, such as apparatus 700, can separate a strengthened glass substrate such as substrate 100. The apparatus 700 may include a workpiece positioning system and a laser system.

Generally, the workpiece support system is configured to support the substrate 100 such that the first surface 102 faces toward the laser system and such that the beam waist is locatable relative to the substrate 100 as exemplarily described above with respect to FIG. 2B. As exemplarily illustrated, the workpiece support system can include a chuck such as chuck 702 configured to support the substrate 100 and a movable stage 704 configured to move the chuck 702. The chuck 702 can be configured to contact only a portion of the second surface 104 of substrate 100 (as illustrated) or may contact all of the second surface 104. Generally, the moveable stage 704 is configured to move the chuck 702 laterally relative to the laser system. Thus the moveable stage 704 can be operated to cause the beam waist to be scanned relative to the substrate 100.

Generally, the laser system is configured to direct a beam such as the aforementioned beam 202 along an optical path (wherein the beam 202 has a beam waist as exemplarily described above with respect to beam waist 204). As exemplarily illustrated, the laser system may include a laser 706 configured to produce a beam 702a of laser light and an optical assembly 708 configured to focus the beam 702a to produce the beam waist 204. The optical assembly 708 may include a lens and may be moveable along a direction indicated by arrow 708a to change the location (e.g., along a z-axis) of the beam waist of the beam 202 relative to the substrate 100. The laser system may further include a beam steering system 710 configured to move the beam waist of the beam 202 laterally relative to the substrate 100 and the workpiece support system. In one embodiment, the beam steering system 710 can include a galvanometer, a fast steering mirror, an acousto-optic deflector, an electro-optic deflector or the like or a combination thereof. Thus the beam steering system 710 can be operated to cause the beam waist to be scanned relative to the substrate 100.

The apparatus 700 may further include a controller 712 communicatively coupled to one or more of the components of the laser system, to one or more of the components of the workpiece support system, or a combination thereof. The controller may include a processor 714 and a memory 716. The processor 714 may be configured to execute instructions stored by the memory 716 to control an operation of at least one component of the laser system, the workpiece support system, or a combination thereof so that the embodiments exemplarily described above with respect to FIGS. 1 to 5 can be performed.

Generally, the processor 714 can include operating logic (not shown) that defines various control functions, and may be in the form of dedicated hardware, such as a hardwired state machine, a processor executing programming instructions, and/or a different form as would occur to those skilled in the art. Operating logic may include digital circuitry, analog circuitry, software, or a hybrid combination of any of these types. In one embodiment, processor 714 includes a programmable microcontroller microprocessor, or other processor that can include one or more processing units arranged to execute instructions stored in memory 716 in accordance with the operating logic. Memory 716 can include one or more types including semiconductor, magnetic, and/or optical varieties, and/or may be of a volatile and/or nonvolatile variety. In one embodiment, memory 716 stores instructions that can be executed by the operating logic. Alternatively or additionally, memory 716 may store data that is manipulated by the operating logic. In one arrangement, operating logic and memory are included in a controller/processor form of operating logic that manages and controls operational aspects of any component of the apparatus 700, although in other arrangements they may be separate.

In one embodiment, the controller 712 may control an operation of one or both the laser system and the workpiece positioning system to form the initiation trench 400 using the laser 706. In another embodiment, the controller 712 may control an operation of at least one of the laser system, the workpiece positioning system and a vent crack initiator system to form the initiation trench 400.

In one embodiment, a vent crack initiator system such as vent crack initiator system 718 may be included within the apparatus 700. The vent crack initiator system 718 can include a vent crack initiator device 720 operative to form the aforementioned initiation trench 400. The vent crack vent crack initiator device 720 may be coupled to a positioning assembly 722 (e.g., a dual-axis robot) configured to move the vent crack initiator device 720 (e.g., along a direction indicated by one or both of arrows 718a and 718b). The vent crack initiator device 720 may include a grinding wheel, a cutting blade, a laser source, an etchant nozzle or the like or a combination thereof. In another embodiment, another vent crack initiator system may include a laser, such as laser 724, operative to generate a beam of light and direct the beam of light into the aforementioned laser system facilitate formation of the initiation trench 400. In yet another embodiment, another vent crack initiator system may include a supplemental laser system configured to generate a beam 726 of laser light sufficient to form the initiation trench 400 as exemplarily described above. Accordingly, the supplemental laser system can include a laser 728 operative to generate a beam 728a of light an optical assembly 730 configured to focus the beam 728a direct the beam 726 to the substrate 100.

The foregoing is illustrative of embodiments of the invention and is not to be construed as limiting thereof. Although a few example embodiments of the invention have been described, those skilled in the art will readily appreciate that many modifications are possible in the example embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the specific example embodiments of the invention disclosed, and that modifications to the disclosed example embodiments, as well as other embodiments, are intended to be included within the scope of the appended claims. The invention is defined by the following claims, with equivalents of the claims to be included therein.

What is claimed is:

1. A method, comprising:
   providing a strengthened glass substrate having a first surface and a second surface opposite the first surface, wherein the substrate has a thickness between the first surface and the second surface, wherein at least one of the first surface and the second surface is compressively stressed to a depth of layer forming a compression region and an interior of the substrate is under a state of tension, wherein the compression region extends from the second surface into the interior of the substrate, wherein the compression region has a compression region thickness, and wherein the substrate also comprises a tension region adjacent to the compression region;

directing a beam of laser light having a wavelength greater than 100 nm and less than 3000 nm to pass through the first surface and to pass through the second surface after passing through the first surface, wherein the beam of laser light has a beam waist outside the substrate;

causing the beam of laser light to be scanned relative to the substrate along a guide path, including scanning the beam of laser light between two end points on the guide path at least once;

removing material from the second surface of the substrate at a plurality of locations along the guide path with the beam of laser light, wherein the beam waist is positioned closer to the second surface than the first surface during removal of the material, and wherein the material is removed to a trench depth to form a guide trench extending into the substrate to the trench depth, wherein the trench depth is greater than or equal to 1% of the compression region thickness and less than or equal to 100% of the compression region thickness; and separating the substrate along the guide path.

2. The method of claim 1, wherein the compression region thickness is greater than 10 μm.

3. The method of claim 2, wherein the compression region thickness is greater than 50 μm.

4. The method of claim 1, wherein light within the beam of laser light has at least one wavelength in the ultraviolet spectrum.

5. The method of claim 1, further comprising scanning the beam of laser light between the two end points along the guide path at least 5 times.

6. The method of claim 1, further comprising scanning the beam of laser light along at least a portion of the guide path at a scan rate greater than 1 m/s.

7. The method of claim 1, wherein at least a portion of the guide path extends in a straight line along the first surface.

8. The method of claim 1, wherein at least a portion of the guide path extends in a curved line along the first surface.

9. The method of claim 1, wherein the guide trench depth of at least a portion of the guide trench is less than the compression region thickness.

10. The method of claim 1, wherein the guide trench is configured such that substrate is separable along the guide path upon forming the guide trench.

11. The method of claim 1, wherein the guide trench is configured to ensure that the substrate is prevented from spontaneously separating along the guide trench during formation of the guide trench between the two endpoints and such that substrate remains united upon forming the guide trench, wherein separating the substrate comprises forming a vent crack within the substrate after forming the guide trench, and wherein the vent crack and the guide trench are configured such that the substrate is separable along the guide trench upon forming the vent crack.

12. The method of claim 1, wherein the beam of laser light has an intensity and a fluence in a spot at the second surface of the substrate sufficient to stimulate multiphoton absorption of light by a portion of the substrate illuminated by the spot.

13. The method of claim 1, wherein, during the step of removing material from the second surface of the substrate, the beam of laser light is nonlinearly focused within the substrate to damage the interior of the substrate to facilitate the step of separating the substrate that is subsequent to and distinct from the step of removing material from the second surface of the substrate.

14. The method of claim 13, wherein the damage to the interior of the substrate is caused by one or more of: a nonlinear Kerr effect, diffraction, and plasma defocusing.

15. The method of claim 1, wherein the substrate comprises strengthened glass, wherein the substrate has an edge extending between the first surface and the second surface, and wherein an end point is spaced apart from the edge.

16. The method of claim 15, wherein causing the beam of laser light to be scanned relative to the substrate along the guide path comprises scanning the beam of laser light between the two end points on the guide path multiple times, wherein guide trench parameters are selected to ensure that the substrate is prevented from spontaneously separating along the guide trench during formation of the guide trench between the two end points.

17. The method of claim 16, wherein the trench depth is greater than 30 μm.

18. The method of claim 15, wherein the guide trench is configured to ensure that the substrate is prevented from spontaneously separating along the guide trench during formation of the guide trench between the two end points and such that substrate remains united upon forming the guide trench, wherein separating the substrate comprises forming a vent crack within the substrate after forming the guide trench, and wherein the vent crack and the guide trench are configured such that the substrate is separable along the guide trench upon forming the vent crack.

19. The method of claim 18, wherein the vent crack results from formation of an initiation trench between the edge and the end point spaced apart from the edge, and wherein, upon formation of the initiation trench, the vent crack spontaneously propagates along the guide trench to separate the substrate.

20. The method of claim 19, wherein the initiation trench has an initiation depth that is greater than the trench depth of the guide trench.

21. The method of claim 18, wherein the vent crack results from formation of an initiation trench within the guide trench, and wherein, upon formation of the initiation trench, the vent crack spontaneously propagates along the guide trench to separate the substrate.

22. A method, comprising:
providing a strengthened glass substrate having a first surface and a second surface opposite the first surface, wherein at least one of the first surface and the second surface is compressively stressed to a depth of layer forming a compression region, wherein an interior of the substrate is under a state of tension, wherein the compression region extends from the second surface into the interior of the substrate to the depth of layer, and wherein the tension region is adjacent to the compression region;

machining the substrate at a plurality of positions within the substrate, wherein at least one of the plurality of machined positions is located at the second surface and at least one of the plurality of positions is located within the interior of the substrate, the machining comprising:

directing a beam of laser light having a wavelength greater than 100 nm and less than 3000 nm to pass through the first surface and to pass through the second surface after passing through the first surface, wherein the beam of laser light has a beam waist outside the substrate, and wherein the beam of laser light has an intensity and a fluence in a spot at the second surface of the substrate sufficient to stimulate multiphoton absorption of light by a portion of the substrate illuminated by the spot; and causing the beam of laser light to be scanned relative to the substrate including scanning the beam of laser light between two end points on the guide path at least once such that at least some of the plurality of machined positions are arranged along a guide path, wherein machining the substrate comprises removing substrate material extending from the second surface into the interior of the substrate to form a guide trench extending into the substrate along the guide path, wherein the plurality of positions occur within a range of depths from the second surface wherein the guide trench has a guide trench depth that is greater than or equal to 1% of the depth of layer and less than or equal to 100% of the depth of layer; and separating the substrate along the guide path.

23. The method of claim 22, wherein the spot has an elliptical shape.

24. The method of claim 22, wherein, during the step of causing the beam of laser light to be scanned relative to the substrate, the beam of laser light is nonlinearly focused within the substrate to damage the interior of the substrate to facilitate the step of separating the substrate that is subsequent to and distinct from the step of causing the beam of laser light to be scanned relative to the substrate.

25. The method of claim 22, wherein the damage to the interior of the substrate is caused by one or more of: a nonlinear Kerr effect, diffraction, and plasma defocusing.

26. The method of claim 22, wherein the substrate has an edge extending between the first surface and the second surface, and wherein an end point is spaced apart from the edge.

27. The method of claim 26, wherein causing the beam of laser light to be scanned relative to the substrate comprises scanning the beam of laser light multiple times between the two end points along the guide path to form the guide trench, wherein guide trench parameters are selected to ensure that the substrate is prevented from spontaneously separating along the guide trench during formation of the guide trench between the two end points.

28. The method of claim 26, wherein the guide trench is configured to ensure that the substrate is prevented from spontaneously separating along the guide trench during formation of the guide trench between the two end points and such that substrate remains united upon forming the guide trench, wherein separating the substrate comprises forming a vent crack within the substrate after forming the guide trench, and wherein the vent crack and the guide trench are configured such that the substrate is separable along the guide trench upon forming the vent crack.

29. A method, comprising:
providing a strengthened glass substrate having a first surface and a second surface opposite the first surface, wherein the substrate has a thickness between the first surface and the second surface, wherein at least one of the first surface and the second surface is compressively stressed to a depth of layer forming a compression region and an interior of the substrate is under a state of tension, wherein the compression region extends from the first surface into the interior of the substrate, wherein the compression region has a compression region thickness, and wherein the substrate also comprises a tension region adjacent to the compression region;

directing a beam of laser light having a wavelength greater than 100 nm and less than 3000 nm to pass through the first surface and to pass through the second surface after passing through the first surface, wherein the beam of laser light has a beam waist at the second surface of the substrate;

causing the beam of laser light to be scanned relative to the substrate along a guide path, including scanning the beam of laser light between two end points on the guide path at least once;

removing material from the second surface of the substrate at a plurality of locations along the guide path with the beam of laser light, wherein the beam waist is positioned at the second surface of the substrate during removal of the material from the second surface, and wherein the material is removed to a trench depth to form a guide trench extending into the substrate to the trench depth, wherein the trench depth is greater than or equal to 1% of the compression region thickness and less than or equal to 100% of the compression region thickness; and separating the substrate along the guide path.

30. The method of claim 29, wherein, during the step of removing material from the first surface of the substrate, the beam of laser light is nonlinearly focused within the substrate to damage the interior of the substrate to facilitate the step of separating the substrate that is subsequent to and distinct from the step of removing material from the second surface of the substrate.

31. The method of claim 30, wherein the damage to the interior of the substrate is caused by one or more of: a nonlinear Kerr effect, diffraction, and plasma defocusing.

32. The method of claim 29, wherein the substrate comprises strengthened glass, wherein the substrate has an edge extending between the first surface and the second surface, wherein an end point is spaced apart from the edge, wherein causing the beam of laser light to be scanned relative to the substrate along the guide path comprises scanning the beam of laser light between the two end points on the guide path multiple times, wherein guide trench parameters are selected to ensure that the substrate is prevented from spontaneously separating along the guide trench during formation of the guide trench between the two end points.

33. The method of claim 29, wherein the substrate comprises strengthened glass, wherein the substrate has an edge extending between the first surface and the second surface, wherein an end point is spaced apart from the edge, wherein removing material from the second surface of the substrate comprises forming a guide trench extending into the substrate, wherein the guide trench is configured to ensure that the substrate is prevented from spontaneously separating along the guide trench during formation of the guide trench between the two end points and such that substrate remains united upon forming the guide trench, wherein separating the substrate comprises forming a vent crack within the substrate after forming the guide trench, and wherein the vent crack and the guide trench are configured such that the substrate is separable along the guide trench upon forming the vent crack.

34. The method of claim 33, wherein the vent crack results from formation of an initiation trench between the edge and the end point spaced apart from the edge, and wherein, upon formation of the initiation trench, the vent crack spontaneously propagates along the guide trench to separate the substrate.

* * * * *